United States Patent

[11] 3,631,836

[72] Inventors Gary N. Jarvela;
Loren L. Pyle, both of Scottsdale, Ariz.
[21] Appl. No. 848,019
[22] Filed Aug. 6, 1969
[45] Patented Jan. 4, 1972
[73] Assignee Motorola, Inc.
Franklin Park, Ill.

[54] FIXED GRADIENT LIQUID EPITAXY APPARATUS
6 Claims, 8 Drawing Figs.

[52] U.S. Cl. .... 118/415
[51] Int. Cl. .... B05c 3/02
[50] Field of Search .... 118/412, 415, 407; 148/175

[56] References Cited

UNITED STATES PATENTS 2,243,674 5/1941 Hoch .... 118/415 X
3,289,241 12/1966 Garrison et al. .... 118/415 X

*Primary Examiner*—John P. McIntosh
*Attorney*—Mueller & Aichele

ABSTRACT: A method and apparatus for growing an epitaxial layer on a semiconductor substrate by the use of liquid phase transport and a fixed temperature gradient are disclosed. The apparatus consists of a lower block and a movable upper block which slides across the lower block. The lower block has one or more recessed portions suitable for holding one or more semiconductor wafers, such as gallium arsenide, on which an epitaxial layer is desired. The upper block similarly has one or more centerbores with slideable pistons disposed therein. A solvent such as gallium and a semiconductor source material such as a gallium arsenide wafer are located in the centerbore below the piston. Growth of the epitaxial layer on the substrate occurs at an elevated temperature when the centerbore of the upper block is in registration with the recessed portion of the lower block and the lower block is at a temperature that is slightly lower than the temperature of the upper block. The method includes the step of sliding the blocks so that the centerbore is out of registration with the recessed portion of the lower block thereby removing the solvent from the surface of the epitaxial layer to terminate the epitaxial growth.

INVENTOR.
Gary N Jarvela
Loren L Pyle
BY
Mueller, Aichele, & Rauner
Attys

FIXED GRADIENT LIQUID EPITAXY APPARATUS

BACKGROUND OF THE INVENTION

This invention relates to an apparatus for growing crystals and more particularly to an apparatus for growing epitaxial layers on semiconductors from liquids.

The commercial manufacture of epitaxial layers on semiconductors such as silicon and germanium has been substantially performed by a vapor phase process. However, deposition of epitaxial layers of some materials from a vapor phase has several disadvantages such as high structural imperfection in the epitaxial layer, difficulty of obtaining high purity in the epitaxial layers and poor reproducibility between runs.

Another problem encountered with the vapor phase method of epitaxial growth is the difficulty of using this method for intermetallic semiconductor compounds such as gallium arsenide or gallium phosphide. These intermetallic compounds do not easily lend themselves to vapor phase epitaxial deposition due to the higher vapor pressure of one or more of the elements in the intermetallic compounds at the elevated temperatures used for epitaxial growth in this method.

The growth of epitaxial layers on semiconductors by the use of a liquid phase process has the advantage of producing a good quality structural epitaxial film as well as producing a film of high purity. The liquid phase processes of forming epitaxial layers have in the past had the disadvantages of poor reproducibility, long process times, and they have not lent themselves to mass production or automation.

Gallium arsenide epitaxial layers have been grown in the laboratory on individual wafers of gallium arsenide by the use of a liquid phase method which involves a fixed temperature gradient. In this method, a thin zone of gallium serves as the solvent and is sandwiched between a gallium arsenide substrate, on which the epitaxial layer is deposited, and a gallium arsenide source. By maintaining a temperature gradient between the gallium arsenide substrate and the gallium arsenide source, whereby the gallium arsenide source is at a higher temperature, the gallium arsenide dissolves into the solvent. When the solvent becomes saturated with gallium arsenide, a gallium arsenide layer is deposited on the gallium arsenide substrate. The liquid phase epitaxial method referred to above as it has been practiced heretofore has required extended periods of time in order to grow the epitaxial layer and has not been suitable for the mass production of intermetallic semiconductors.

SUMMARY OF THE INVENTION

It is an object of this invention to provide an apparatus to grow epitaxial layers on semiconductors.

It is still another object of this invention to provide an improved apparatus for liquid phase epitaxial growth in which initiation and termination of growth are controlled.

These and other objects are accomplished by an apparatus consisting of a lower block having a recessed portion on the upper surface adapted to accept one or more semiconductor substrates, for example gallium arsenide, on which an epitaxial layer will be grown. Positioned on top of the lower block is a slideable upper block having a centerbore therethrough. In the centerbore is a solvent such as gallium, a semiconductor source material such as gallium arsenide, and a slideable piston or plug. When the centerbore of the upper block and the recessed portion of the lower block are in registration with each other, and the temperature of the upper block is at a temperature up to 60° higher than the lower block, epitaxial growth on the gallium arsenide substrate in the lower block will proceed. The epitaxial growth is terminated by sliding the blocks so that the centerbore is out of registration with the lower block. A shoulder on the lower surface of the upper block which extends into the centerbore wipes the excess solvent off of the surface of the epitaxial layer.

Other objects and advantages of the invention will be apparent from the following detailed description, reference being made to the accompanying drawings wherein a preferred embodiment of this invention is shown.

IN THE DRAWINGS

DESCRIPTION OF THE ILLUSTRATIVE EMBODIMENTS

Figure 1:
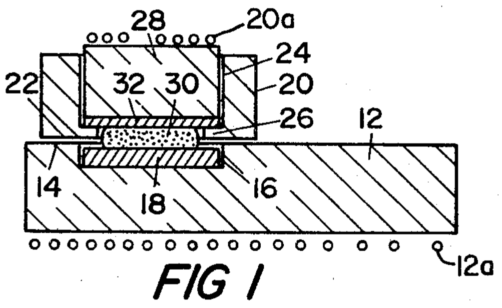
FIG. 1 is a side view of the apparatus encompassing this invention.

As shown in FIG. 1, the apparatus consists of a lower block 12 having an upper surface 14. On the upper surface 14 is a recessed portion 16 which is sufficiently deep to accommodate the semiconductor wafer 18. Although only one recessed portion 16 is shown in FIG. 1, there may be a plurality of such recessed portions. The depth of the recessed portion 16 is determined by adding the thickness of the wafer or substrate 18 to the desired thickness of the epitaxial layer. For example, when it is desired to form an epitaxial layer having a thickness of 2 mils on a wafer 12 mils thick, the recessed portion of the lower block 12 is made 14 mils deep plus necessary tolerance.

An upper block 20 has a lower surface 22 which is positioned on the lower block upper surface 14. The upper block 20 has a centerbore 24 therethrough which extends through to the lower surface 22. The upper block 20 has a shoulder portion 26 extending into the centerbore 24 at the lower surface 22. The shoulder portion 26 serves as a support to prevent the semiconductor source 32 from coming into contact with the semiconductor substrate 18 on which the epitaxial layer is to be deposited. After the epitaxial layer is formed, the blocks are moved so that the recessed portion 16 is out of registration with the centerbore 24. During this step, the shoulder portion 26 wipes the excess solvent 30 from the epitaxial layer on the semiconductor substrate 18. This will be more fully described in the specification dealing with the method and FIG. 2G. A slideable plug or piston 28 is positioned in the centerbore 24. The piston 28 keeps the semiconductor source 32 in contact with the solvent 30. The piston 28 also serves as a thermal shield or baffle thereby enabling more accurate temperature control over the semiconductor source 32, solvent 30, and the semiconductor substrate 18. The upper and lower blocks 12 and 20 and the piston 28 are made of a high purity nonreacting refractory such as graphite, boron nitride, or the like. High purity graphite is a preferred material. The piston 28 may be made of a porous material such as alumina to permit the use of a gaseous semiconductor source.

The apparatus is positioned as shown in FIG. 1 during the growth of the epitaxial layer. The plug 28 rests on top of the semiconductor source wafer 32 so as to maintain contact between the wafer 32 and the solvent 30. The solvent 30 is also in contact with the semiconductor substrate 18. Heating means, shown diagrammatically and identified by reference characters **20*a* for the upper block and 12*a* for the lower block, maintain the temperature of the upper block 20 at a fixed temperature between 2° and 50° C. higher than the lower block temperature 12, thereby insuring a fixed temperature gradient between the semiconductor source 32 and the semiconductor substrate 18. With a fixed temperature gradient being maintained, semiconductor material from the source 32 dissolves in the solvent 30. Semiconductor material in the solvent 30 is deposited on the substrate surface 18** thereby forming an epitaxial layer.

The apparatus and method of this invention are particularly well suited to intermetallic semiconductor compounds such as gallium arsenide or gallium phosphide, formed of the respective elements from the third and fifth groups of the periodic system as well as zinc selenide and cadmium telluride formed of respective elements from the second and sixth groups of the periodic system. This apparatus and method can also be employed for silicon and germanium semiconductors.

The following table is illustrative of some of the intermetallic semiconductor compounds and solvents suitable in the practice of this invention:

| Group Type | Semiconductor | Solvent |
|---|---|---|

| | | |
|---|---|---|
| III–V | GaSb | Ga |
| III–V | GaAs | Ga |
| III–V | GaP | Ga |
| III–V | InSb | In |
| III–V | InP | In |
| III–V | AlAs | Al |
| II–VI | ZnTe | Zn |
| II–VI | CdSe | Cd |

The invention will now be described in terms of a method used to prepare an epitaxial layer on an intermetallic semiconductor wafer.

Figure 2D:
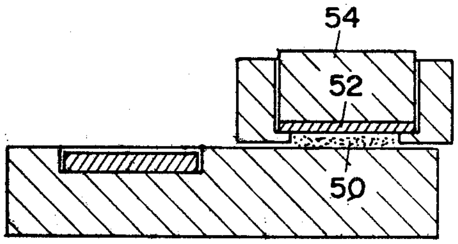
FIG. 2 is a side view of the apparatus featuring the steps of the method in this invention.
Figure 2A:
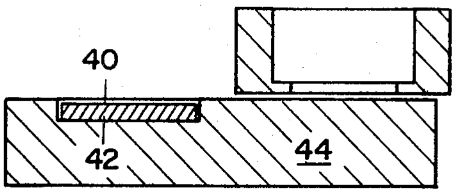
Figure 2E:
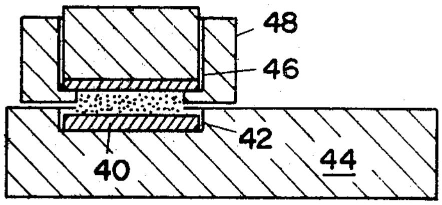
Figure 2B:
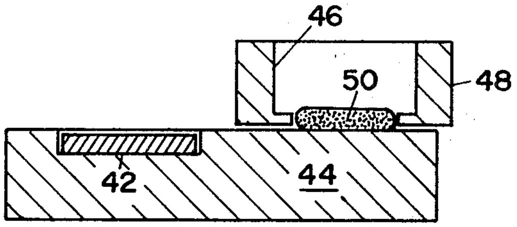
Figure 2F:
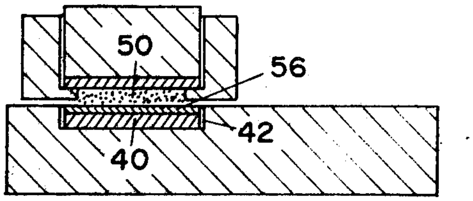
Figure 2C:
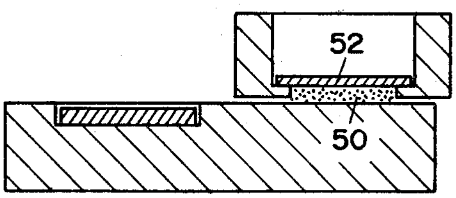

The upper block, lower block, and the piston are cleaned by baking at an elevated temperature in a reduced atmosphere. These parts are then etched in a reducing atmosphere containing an acidic component. An intermetallic semiconductor wafer is placed in the recessed portion of the lower block 44 as shown in FIG. 2A. The blocks are moved so that the centerbore 46 of upper block 48 is out of registration with the recessed portion 42 of lower block 44. The solvent 50 is placed in the centerbore 46 as shown in FIG. 2B. On top of the solvent 50 is placed an intermetallic semiconductor source wafer 52 as shown in FIG. 2C. On top of the semiconductor source wafer 52 is placed a slideable piston 54 as shown in FIG. 2D. The slideable piston 54 insures contact between the source 52 and the solvent 50. The system as disclosed in FIG. 2 is then placed in a quartz tube and purged with nitrogen gas. After flushing the system with nitrogen gas, hydrogen or another nonoxidizing gas such as helium, argon, 95 percent nitrogen-5 percent hydrogen mixture, or the like, is passed through the quartz tube over the apparatus and is vented to burn off exhaust; that is, the hydrogen gas is burned as it leaves the tube.

The upper and lower blocks and piston are heated to a temperature in the range of 800° to 1,000° C. with the apparatus in the position indicated in FIG. 2D. This configuration is maintained until saturation of the solvent by the source is accomplished. After both the upper block and lower block have been heated to a temperature in the range heretofore mentioned, the upper block is moved so that the centerbore 46 is in registration with the recessed portion 42 of the lower block 44 as shown in FIG. 2E. The apparatus is now in position to start the epitaxial growth. An optional step at this point is to back etch the surface of the substrate 40. This is accomplished by raising the temperature of the lower block 44 to a temperature about 2° to 10° C. higher than the upper block 48. This back etching step takes several minutes and is preferred since it provides a high quality surface on which to deposit the epitaxial layer. After the back etching step, the temperature of the lower block is then lowered to establish a temperature gradient in which the upper block has a temperature 2° to 50° C. higher than the lower block. This is to insure a temperature gradient between the semiconductor source 46 and the semiconductor substrate 40. During this time the upper block is kept at the same fixed temperature. The growth rate of the epitaxial layer is dependent upon the temperature gradient between the semiconductor substrate 40 and the semiconductor source 46; that is, the higher the temperature gradient, the faster the growth rate. The temperature across the solvent from the semiconductor source to the semiconductor wafer is the critical gradient parameter, although an indication of this parameter is conveniently measured by measuring the temperature of the upper block and lower block. The temperature at which the growth takes place also determines the rate of epitaxial growth; that is, the higher the temperature, the higher the growth rate. As shown in FIG. 2F, the semiconductor substrate 40 has an epitaxial layer 56 which will grow to a depth which is determined by the depth of the recessed portion 42.

Figure 2G:
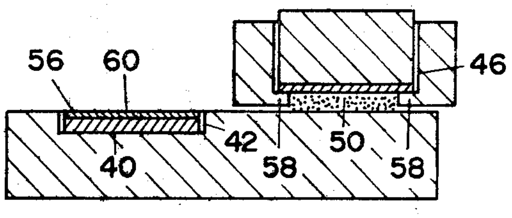

The growth of the epitaxial layer 46 is terminated in accordance with this invention by moving the blocks as shown in FIG. 2G so that the centerbore 46 is out of registration with the recessed portion 42. In this step, shoulders 58 of the upper block wipe the surface of the epitaxial layer 60 to remove the excess solvent 50. This step is essential in the practice of this invention and provides the means to shorten the process time to the order of 30 minutes. In addition, by wiping the excess solvent off of the surface 60 and maintaining the solvent in the centerbore 46 of the upper block, only a small quantity of solvent is required, thereby reducing the cost of the process. Another way that the growth may be terminated is by eliminating the temperature gradient created between the upper and lower blocks.

While it is possible to change both the upper and lower block temperatures and still retain a constant temperature gradient during the epitaxial growth, it is preferred that the constant temperature gradient be maintained by keeping the upper block constant during the epitaxial growth step.

EXAMPLE 1

The upper block, the lower block, and piston which were constructed of a high purity graphite were baked for 30 minutes at 1,200° C. in a hydrogen atmosphere to clean the parts. These parts were also cleaned by etching in a hydrogen atmosphere containing about 3 percent (by volume) HCl gas at 1,200° C. for 10 minutes. A gallium arsenide wafer on which an epitaxial layer was to be deposited having a thickness of 12 mils and weighing about 0.1 grams was placed in the recessed portion of the lower block. The upper block was placed on top of the lower block so that the centerbore was out of registration with the recessed portion of the lower block. A quantity of gallium weighing about 1 gram was placed on the bottom of the centerbore between the shoulders of the upper block. On top of the gallium was placed a gallium arsenide wafer weighing about 0.1 grams and having a thickness of about 12 mils which served as a semiconductor source. On top of the gallium arsenide source wafer was placed the piston. The apparatus was placed in a quartz tube and flushed with nitrogen. Hydrogen was then passed through the quartz tube over the apparatus and vented so that the exhaust burned off. The apparatus with the centerbore of the upper block and the recessed portion of the lower block out of registration with each other and including the hydrogen atmosphere was placed in a split or clam shell furnace and heated to a temperature of 850° C.

After both the upper block and the lower block were heated to a temperature of 850° C., the blocks were moved so that the centerbore was in registration with the recessed portion of the lower block. The temperature of the lower block was then raised 5° C. to back etch the surface of the gallium arsenide substrate for 2 minutes. The temperature of the lower block was then lowered to establish a temperature gradient of about 20° C., that is, the temperature of the lower block was 20° C. lower than the upper block. The temperature gradient of 20° C. was maintained for a period of about 20 minutes while the epitaxial layer was growing. The blocks were then moved apart so that the centerbore was out of registration with the recessed portion of the lower block thereby terminating the growth of the epitaxial layer. The gallium arsenide substrate which had an epitaxial layer of about 2 mils thereon was removed from the lower block.

The method and apparatus of this invention enable the operator to initiate and to terminate epitaxial growth on substrates readily, particularly on intermetallic semiconductors on which epitaxial layers are difficult to deposit. In addition, the growth rate can be very accurately controlled and the incorporation of impurities in the epitaxial layer can be kept to a minimum. This apparatus permits one to process a number of wafers at one time and lends itself to automation. The time required with this method is about 20 to 40 minutes compared with prior art methods requiring several hours.

While the invention has been described in terms of a preferred embodiment, the scope of the invention is defined in the following claims:

We claim:

1. A crystal growing apparatus comprising a lower block having at least one recessed portion therein on the upper surface thereof adapted to receive at least one semiconductor substrate, a movable upper block having a lower surface thereon positioned on said upper surface of said lower block, said upper block having a centerbore therethrough extending through said lower surface, said upper block having a shoulder protruding into said centerbore at said lower surface, a slideable plug means in said centerbore positioned above said shoulder, and heating means adapted to heat said upper block to a temperature higher than the temperature of said lower block.

2. A crystal growing apparatus as described in claim 1 wherein said lower block has a plurality of recessed portions therein on the upper surface thereof.

3. A crystal growing apparatus as described in claim 1 wherein said lower block is graphite.

4. A crystal growing apparatus as described in claim 1 wherein said lower block is boron nitride.

5. A crystal growing apparatus as described in claim 1 wherein said plug means are porous.

6. A crystal growing apparatus as described in claim 1 wherein said upper block is adapted to move in a horizontal direction.

* * * * *